United States Patent
Aerrabotu et al.

(10) Patent No.: US 7,546,149 B2
(45) Date of Patent: Jun. 9, 2009

(54) DEEP SLEEP MODE FOR PORTABLE COMMUNICATION DEVICE

(75) Inventors: Naveen Aerrabotu, Gurnee, IL (US); William P. Alberth, Jr., Prairie Grove, IL (US); Daniel J. Declerck, Lake Barrington, IL (US); Murall Narasimha, Grayslake, IL (US); William E. Welnick, Poway, CA (US)

(73) Assignee: Motorola, Inc., Schaumburg, IL (US)

( * ) Notice: Subject to any disclaimer, the term of this patent is extended or adjusted under 35 U.S.C. 154(b) by 938 days.

(21) Appl. No.: 11/075,540

(22) Filed: Mar. 8, 2005

(65) Prior Publication Data

US 2006/0205444 A1    Sep. 14, 2006

(51) Int. Cl.
*H04B 1/38*      (2006.01)
*H04M 1/00*      (2006.01)

(52) U.S. Cl. .................. 455/574; 455/552.1; 455/553.1; 455/343.2

(58) Field of Classification Search ............... 455/553.1, 455/445, 450, 452.1, 550.1, 552.1, 572, 574, 455/435.2–1, 435.1, 434, 452.2, 343.1–5, 455/432.1, 575.7, 404.1, 67.11; 370/335
See application file for complete search history.

(56) References Cited

U.S. PATENT DOCUMENTS

| | | | |
|---|---|---|---|
| 5,574,996 | A | 11/1996 | Raith et al. |
| 6,181,952 | B1 * | 1/2001 | Murata ..................... 455/552.1 |
| 2003/0119454 | A1 | 6/2003 | Hattori |
| 2004/0022216 | A1 * | 2/2004 | Shi ............................. 370/335 |
| 2004/0185857 | A1 * | 9/2004 | Lee et al. ..................... 455/445 |
| 2004/0204035 | A1 * | 10/2004 | Raghuram et al. ....... 455/553.1 |

(Continued)

FOREIGN PATENT DOCUMENTS

EP      0888026 A2    12/1998

(Continued)

OTHER PUBLICATIONS

Mouly M. et al., " Network Management" GSM System for Mobile Communications, Lassay-les-Chateaux, Europe Media, FR, 1993, pp. 566-647, XP000860009, p. 572, Paragraph 9.1.2—p. 576.

(Continued)

*Primary Examiner*—John J Lee
(74) *Attorney, Agent, or Firm*—Ingrassia, Fisher & Lorenz, P.C.

(57) ABSTRACT

A portable communication device (100) is provided with first transceiver circuitry (104) for sending and receiving signals on a first communication path and second transceiver circuitry (116) for sending and receiving signals on a second communication path. The portable communication device (100) also includes a controller (112) coupled to the first transceiver circuitry (104) and the second transceiver circuitry (116) for providing a deregistration message to the second transceiver circuitry (116) for transmission therefrom in response to determining that the portable communication device (100) is within signal coverage of the first communication path, activating the first transceiver circuitry (104) to send and receive signals on the first communication path, deactivating the second transceiver circuitry (116), and thereafter activating the second transceiver circuitry (116) at times separated by a predetermined time interval to monitor at least one housekeeping channel of the second communication path.

13 Claims, 4 Drawing Sheets

U.S. PATENT DOCUMENTS

2004/0204038 A1* 10/2004 Suzuki et al. ............ 455/553.1
2007/0225034 A1* 9/2007 Schmidt .................. 455/552.1

FOREIGN PATENT DOCUMENTS

EP 1496719 A1 1/2005
EP 1 496 719 A1 * 2/2005

OTHER PUBLICATIONS

International Search Report PCT/US2006/005336 dated Jun. 30, 2006.

Mouly, M., et al., Network Management GSM System for Mobile Communication, Europe Media, pp. 556-647, 1993.

* cited by examiner

DEEP SLEEP MODE FOR PORTABLE COMMUNICATION DEVICE

FIELD OF THE INVENTION

The present invention generally relates to power conservation in portable communication devices, and more particularly relates to power conservation in portable communication devices having a CDMA-based communication path and at least one other communication path.

BACKGROUND OF THE INVENTION

A key design parameter in portable communication devices is power conservation. Power conservation techniques try to balance the need for conserving battery power with other design parameters. One such design parameter is placement of an emergency call. such as when a user dials "911". When a portable communication device operable on more than one communication path and one of the communication paths on which the portable communication device is operable is a cellular communication path such as a CDMA 2000communication path, it is generally required that the emergency call be placed on the cellular communication path. This is because cellular networks (such as CDMA networks) have better connectivity to emergency dispatch systems. This requires that, if the portable communication device is operating on the non-cellular communication path, it quickly transition to the cellular communication path to place the emergency call. There is also a need to transition from the non-cellular communication path to the cellular communication path in other situations such as when the edge of the coverage of the non-cellular communication path is reached. Thus, the portable communication device must maintain communication on the cellular communication path, even when communicating on a second communication path which consumes less power. Maintenance of communication on both paths consumes an unacceptable amount of power at the mobile station.

Thus, what is needed is a method and apparatus for power conservation which while conserving power utilizing a non-CDMA based communication path, responds quickly to a user's emergency call or idle handoff scenarios, placing the call on the CDMA-based communication path. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A portable communication device is provided with first transceiver circuitry for sending and receiving signals on a first communication path and second transceiver circuitry for sending and receiving signals on a second communication path. The portable communication device also includes a controller coupled to the first transceiver circuitry and the second transceiver circuitry for providing a deregistration message to the second transceiver circuitry for transmission therefrom in response to determining that the portable communication device is within signal coverage of the first communication path, activating the first transceiver circuitry to send and receive signals on the first communication path, deactivating the second transceiver circuitry, and thereafter activating the second transceiver circuitry at times separated by a predetermined time interval to monitor at least one housekeeping channel of the second communication path.

A method for power conservation in a portable communication device capable of communication on either of a first communication path and a second communication path is also provided. The method includes the steps of detecting signals of a first communication path, operating in a first communication mode on the first communication path, deregistering from the second communication path, while deregistered from the second communication path, monitoring at least one housekeeping channel thereof at times separated by a predetermined time interval, and switching operation from the first communication mode to a second communication mode on the second communication path in response to a predetermined event.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
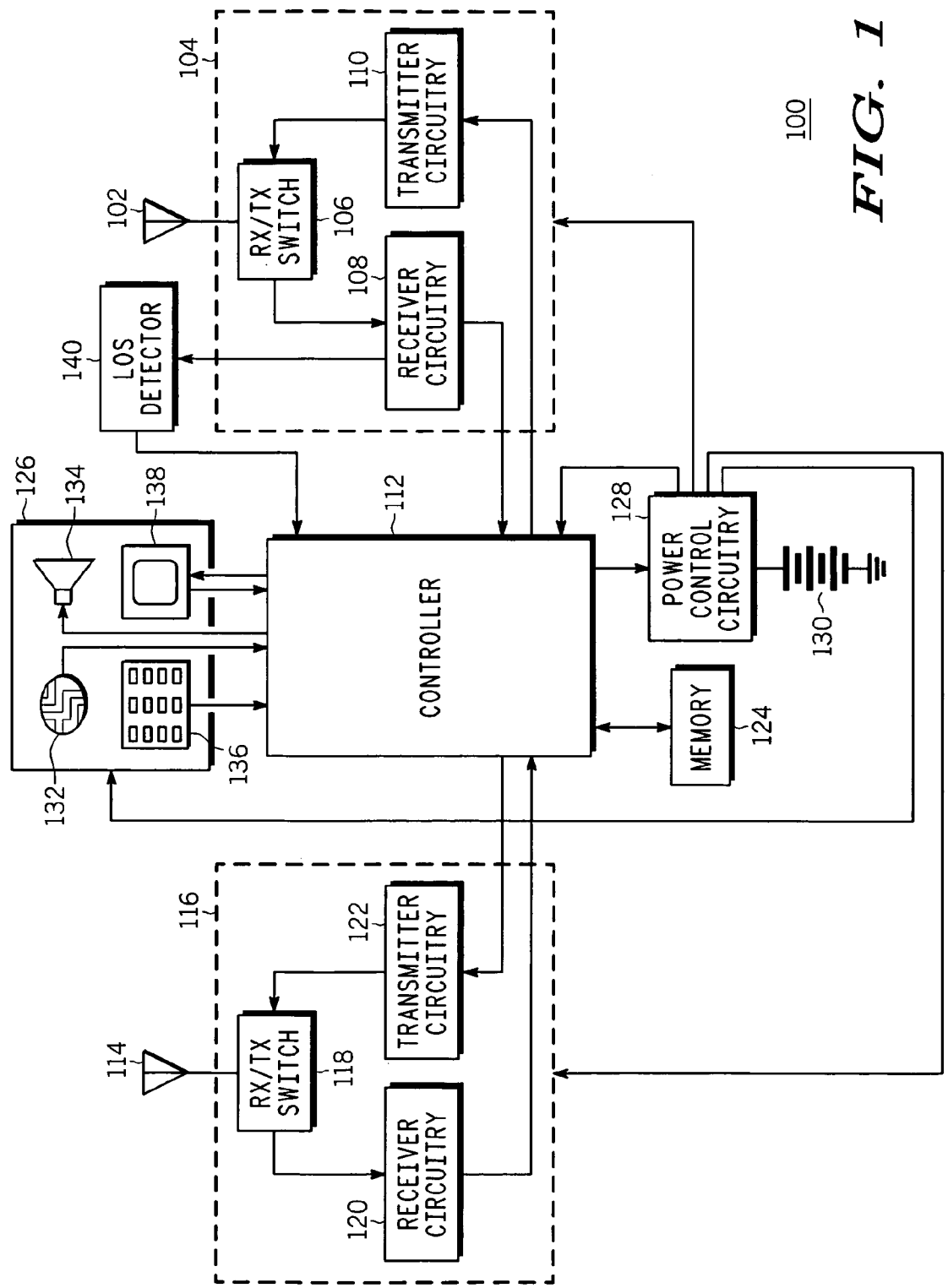
FIG. 1 is a block diagram of a portable communication device in accordance with the preferred embodiment of the present invention.

Referring to FIG. 1, a block diagram of a portable communication device 100, such as a cellular phone, in accordance with the preferred embodiment of the present invention is depicted. The portable electronic device 100 includes a first antenna 102 coupled to first transceiver circuitry 104 for receiving and transmitting radio frequency (RF) signals on a first communication path. The first transceiver circuitry 104 includes a receive/transmit switch 106 which selectively couples the first antenna 102 to receiver circuitry 108 and transmitter circuitry 110 in a manner familiar to those skilled in the art. The receiver circuitry 108 demodulates and decodes the RF signals to derive information therefrom and is coupled to a controller 112 for providing the decoded information thereto for utilization thereby in accordance with the function (s) of the portable communication device 100. The controller 112 also provides information to the transmitter circuitry 110 for encoding and modulating information into RF signals for transmission from the antenna 102. In addition, the controller 112 provides signals to the receive/transmit switch 106 to control the operation thereof.

In accordance with the present invention, the portable communication device 100 is operable on at least two communication paths. Thus, for communication on a second communication path, the portable electronic device 100 includes a second antenna 114 coupled to second transceiver circuitry 116 for receiving and transmitting radio frequency (RF) signals on the second communication path. The second transceiver circuitry 116 includes a receive/transmit switch 118 which selectively couples the second antenna 116 to receiver circuitry 120 for demodulation and decoding of RF signals received on the second communication path and to transmitter circuitry 122 for transmitting encoded and modulated RF signals on the second communication path in a manner familiar to those skilled in the art. The receiver circuitry 120 is coupled to the controller 112 for providing the decoded information thereto for utilization thereby in accordance with the function(s) of the portable communication device 100. The controller 112 also provides information to the transmitter circuitry 122 for encoding and modulating information into RF signals for transmission from the antenna 114.

As is well-known in the art, the controller 112 is typically coupled to a memory device 124 to store and retrieve information for the operation of the portable electronic device 100. In addition, the controller 112 is coupled to a user interface 126 for receiving user input to perform the functions of the portable electronic device 100 and for outputting information to the user. Power control circuitry 128 is coupled to a portable power supply 130, such as a battery, and operates under the control of the controller 112. Power is supplied from the power control circuitry 128 to the components of the portable communication device 100, such as the controller 112, the first transceiver circuitry 104, the second transceiver circuitry 116 and the user interface 126, thereby providing appropriate operational voltage and current to those components. The user interface 126 may include one or more of a microphone 132, a speaker 134 and one or more key inputs 136, including a keypad. The user interface 126 may also include a display 138 which could include touch screen inputs.

In accordance with the preferred embodiment of the present invention, the first communication path is a wireless local area network or metropolitan area network communication path and the portable communication device 100 operates in a first communication mode on the first communication path. The second communication path is a wide area network, such as a digital video broadcasting communication path (DVB-H) or a CDMA-based communication path or, more particularly, a CDMA communication path, and the portable communication device 100 operates in a second communication mode on the second communication path. As is understood by those skilled in the art, communication on a wireless local area network communication path consumes less power than a CDMA-based communication path. However, a wireless local area network has a smaller area of signal coverage than a CDMA cellular telephone network. A limit of signal coverage detector 140 is coupled to the receiver circuitry 108 of the first transceiver circuitry 104 for detecting a limit to the signal coverage of the wireless local area network, thereby detecting when the portable communication device 100 is within the area of signal coverage of the wireless local area network or when the portable communication device 100 reaches a limit of the signal coverage of the wireless local area network and is presumed to be leaving the area of signal coverage of the wireless local area network.

In one implementation, the limit of signal coverage detector 140 comprises a received signal strength detector coupled to the receiver 108 which generates a limit detected signal in response to the signal strength of the received signals on the first communication path rising above or falling below predetermined signal strength thresholds. In order to conserve power, the controller 112 switches operation between the second communication mode on the CDMA network to the first communication mode on the wireless local area network in response to the limit detected signal generated by the limit of signal coverage detector 140. In another implementation, the controller could monitor the signals recovered from the second communication path at the output of the first receiver circuitry 108 to determine the edge of the signal coverage of the first communication path, thereby removing the need for the extra circuitry of the limit of signal coverage detector 140.

The signal coverage of a CDMA communication path is designed to cover wide areas. However, to receive and transmit signals on the CDMA communication path, the second transceiver circuitry 116 requires more power than the first transceiver circuitry operating in the wireless local area network. As is known to those skilled in the art, the CDMA communication path is defined to operate on multiple channels or frequencies. Some of the channels are control channels which provide information necessary for communicating on the CDMA communication path and other channels are temporarily assigned to the portable communication device 100 for communication on the CDMA communication path. Some of the control channels are housekeeping channels, such as the pilot channel or the quick paging channel, which provide control signals necessary for the portable communication device 100 to maintain synchronization with the CDMA communication path and configuration change indicators for updating overhead information stored in the memory 124 and utilized by the controller 112 for controlling operation of the portable communication device 100 in the second communication mode. The CDMA communication path is a synchronous communication system and information is provided on the various channels as digital signals in slots of a predefined length and encoded in accordance with a predefined code division multiplexing scheme. Thus, predetermined operational parameters of the CDMA communication path include a plurality of slot cycle indices where the relationship between the duration of the slot cycle and the slot cycle index (SCI) is defined by $T=1.28 \times 2^{SCI}$. A slot cycle index of two in a CDMA 2000 system corresponds to a time of approximately 5.12 seconds and a slot cycle index of three corresponds to a time of approximately 10.28 seconds. The present invention advantageously allows operation at a larger slot cycle index when in a wireless local area network and deregistered from the CDMA 2000 system than the slot cycle index used for normal operation on the second communication path, thereby conserving more power while maintaining synchronization to the CDMA 2000 system.

Figure 2:
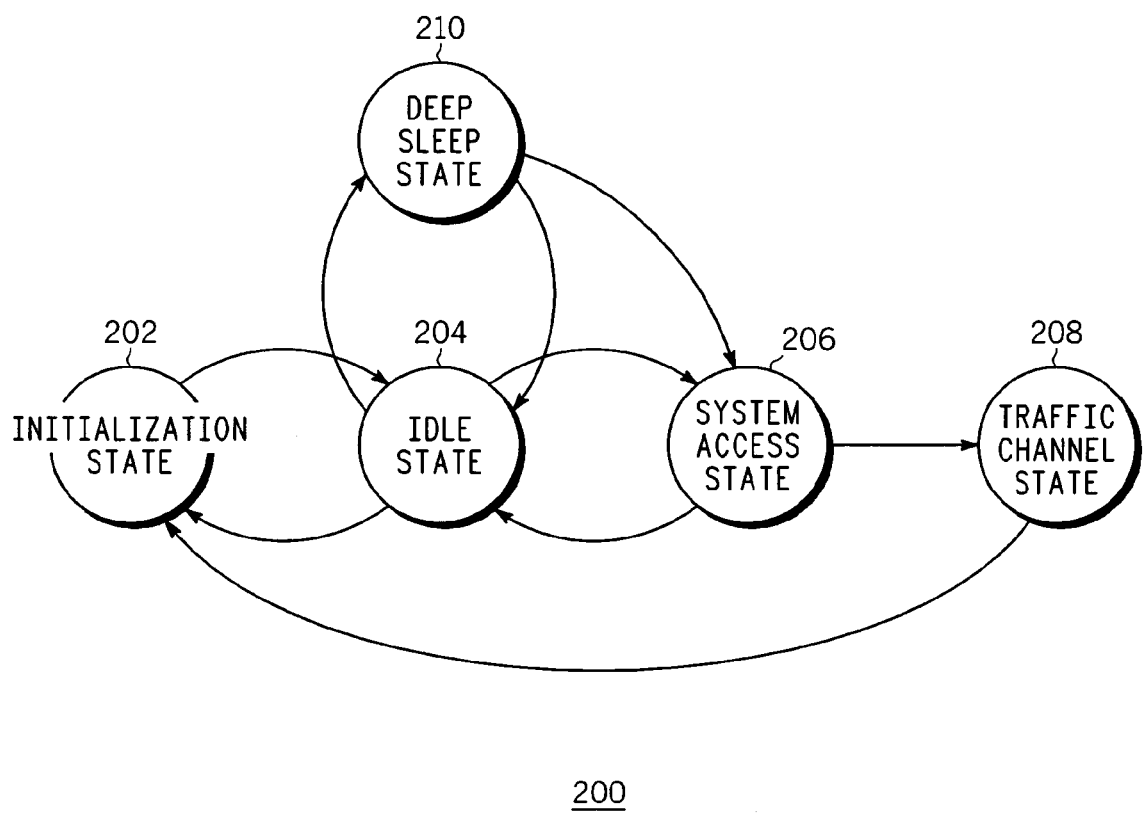
FIG. 2 is a state diagram of the operation of the portable communication device while on the CDMA 2000 communication path in accordance with the preferred embodiment of the present invention.

Referring to FIG. 2, the operation of the portable communication device 100 under the control of the controller 112 in the second communication mode on the CDMA communication path 200 takes place in several states, each state having an operational power associated therewith. During an initialization state 202, the portable communication device 100 registers on the CDMA communication path in a manner familiar to those skilled in the art. After completing all necessary operations in the initialization state 202, the portable communication device 100 switches to an idle state 204 to save power. From the idle state 204, operation either returns to the initialization state for possible re-initialization on the CDMA communication path or switches to a system access state 206 for accessing the CDMA system for registration or other communication thereon. After accessing the CDMA system, communication can occur in a traffic channel state 208 or, if communication is not initiated, operation returns to the power saving idle state 204. When communication is completed or interrupted in the traffic channel state 208, operation returns to the initialization state 202 to re-initiate communication on the CDMA communication path.

In accordance with the present invention, a deep sleep state 210 is defined to advantageously provide additional power conservation by deregistering from the CDMA system and, while deregistered, monitoring one or more of the housekeeping channels, such as the quick paging channel and the pilot channel or just the quick paging channel, at times separated by relatively large time intervals. For example, the deep sleep state 210 operates at a very high slot cycle index, meaning that operation in the deep sleep state 210 may lead to the portable communication device monitoring the quick paging channel much less frequently than in the idle state 204. In accordance with the preferred embodiment of the present invention, operation in the deep sleep state 210 monitors the housekeeping channels at times separated by a predetermined time interval; the predetermined time interval corresponds to a larger slot cycle index than utilized in normal operation on the second communication path, thereby achieving greater power conservation.

Figure 3:
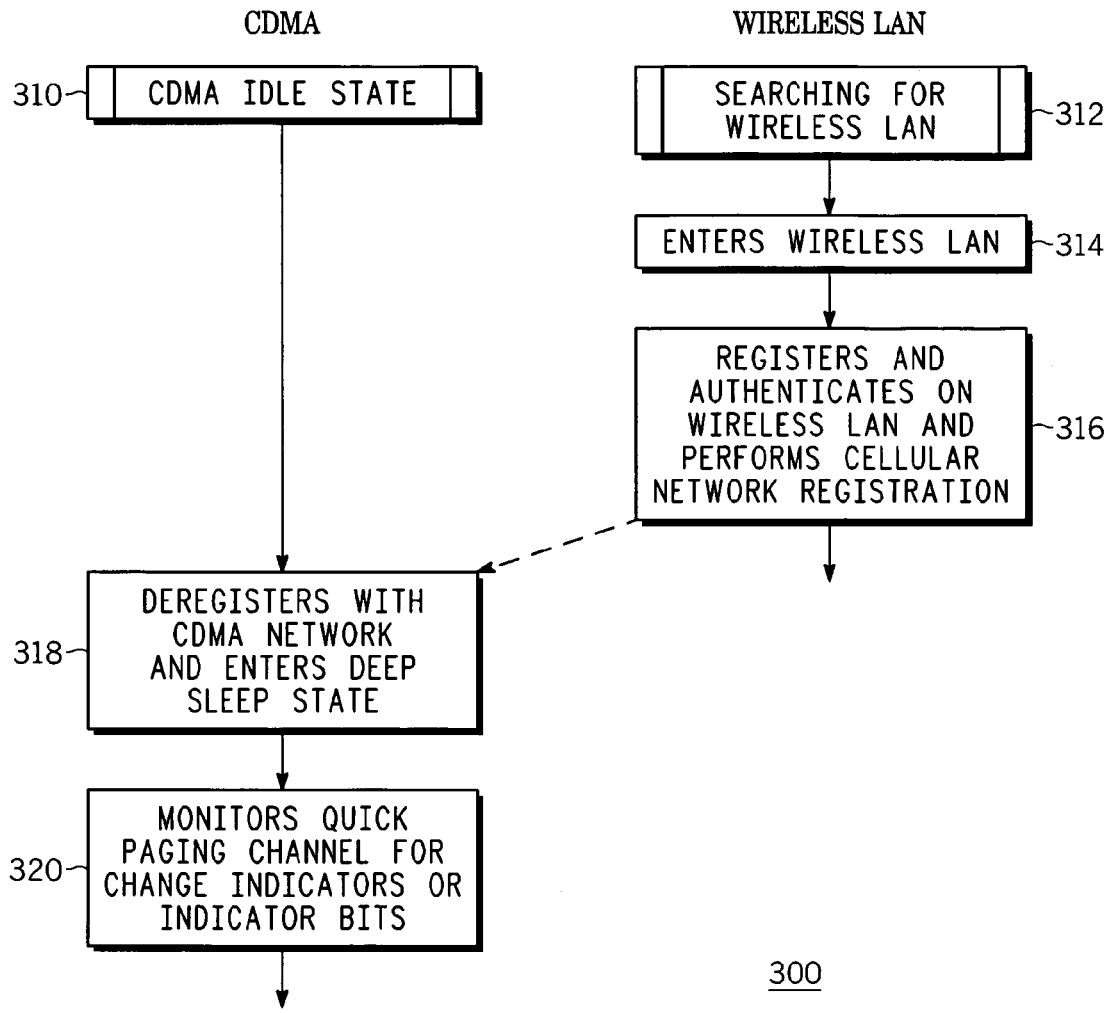
FIG. 3 is a flowchart of the operation of the portable communication device as it enters the deep sleep state in accordance with the preferred embodiment of the present invention.

Referring to FIG. 3, a flowchart 300 of the process for entering the deep sleep state 210 is shown. While the portable communication device 100 operates in the CDMA idle state 204 (FIG. 2) in the second communication mode 310, the controller 112 also searches for signal coverage of the wireless local area communication path 312. In response to the limit detected signal of the limit of signal coverage detector 140, the controller 112 determines that the portable communication device 100 is within the signal coverage of the wireless local area communication path 314 and switches to the second communication mode 316, activating the first transceiver circuitry to send and receive signals on the wireless local area network communication path and registering and authenticating the portable communication device 100 on the wireless local area communication path. After registering to perform cellular communication on the wireless local area network communication path 316, the controller 112 provides a deregistration message 318 to the second transceiver circuitry 116 to deregister the portable communication device 100 from the CDMA communication path and enter the deep sleep state 210, deactivating the second transceiver circuitry 116.

During the deep sleep state 210, the controller 112 monitors the quick paging channel and/or the pilot channel of the CDMA communication path 320 by activating the second transceiver circuitry 116 at a larger slot cycle index, i.e., at times separated by predetermined time intervals. In accordance with the present invention, the predetermined time intervals correspond to slot cycle indices of two or greater. In accordance with the preferred embodiment of the present invention, the controller 112 monitors the quick paging channel 320 to detect configuration change indicators received thereon. In response to detecting configuration change indicators, the controller 112 updates overhead information in the memory 124 (FIG. 1). In an alternate embodiment of the present invention, where configuration change indicators are not supported, the controller monitors the quick paging channel indicator bits that were being monitored prior to switching to entering the deep sleep mode 210. Monitoring of the quick paging channel has the advantage that monitoring it in the above described manner utilizes very little power. The paging channel or any other control channel can be used for monitoring instead of the quick paging channel.

Figure 4:
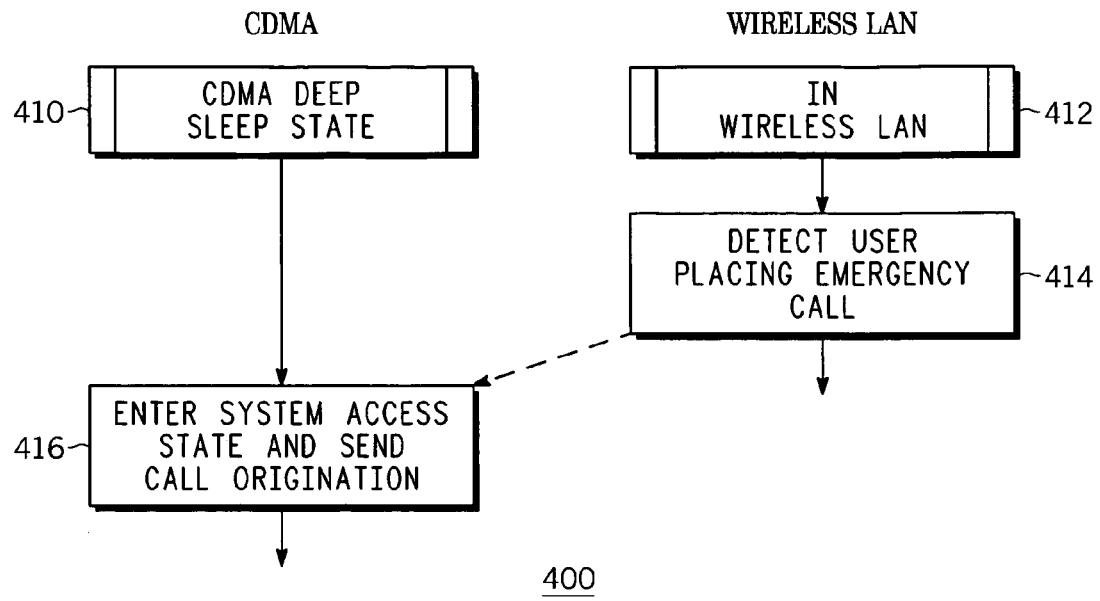
FIG. 4 is a flowchart of the operation of the portable communication device as it exits the deep sleep state in accordance with a first aspect of the preferred embodiment of the present invention.

Referring next to FIG. 4, a flowchart 400 of exiting the deep sleep state 210 in accordance with a first aspect of the present invention is shown. When operating 410 in the deep sleep state 210 while the portable communication device 100 is operating in the first communication mode 412 on the wireless local area communication path, the controller 112 switches operation of the portable communication device 100 from the first communication mode to the second communication mode in response to a predetermined event, such as a predetermined user input indicating a request for a communication type not supported by the first communication mode. One such predetermined event is the placement of an emergency call by a user 414. Emergency calls should take place on the CDMA communication path and not on the wireless local area network communication path. Therefore, when a predetermined user input indicating an emergency call 414 is received by the user interface 126, the controller 112 activates the second transceiver circuitry 416, switching operation from the first communication mode to the second communication mode, by entering the system access state 206 and providing a registration message to the transceiver circuitry 116 for transmission therefrom.

Figure 5:
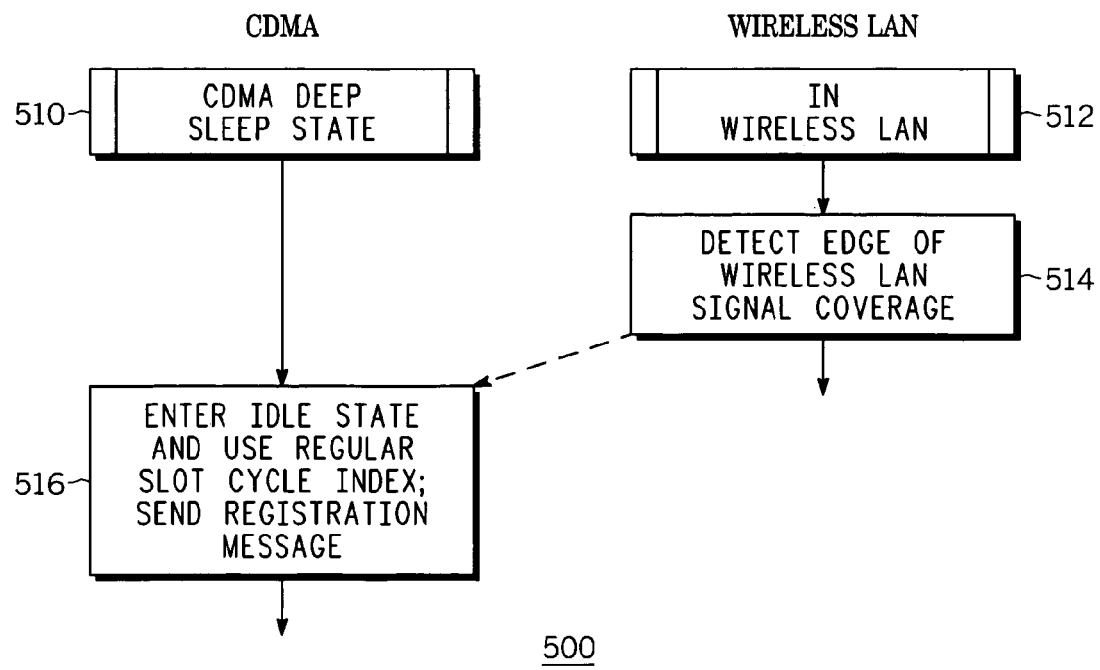
FIG. 5 is a flowchart of the operation of the portable communication device as it exits the deep sleep state in accordance with a second aspect of the preferred embodiment of the present invention.

Referring to FIG. 5, a flowchart 500 of exiting the deep sleep state 210 in accordance with a second aspect of the present invention is shown. When operating 510 in the deep sleep state 210 while the portable communication device 100 is operating in the first communication mode 512 on the wireless local area communication path, the controller 112 switches operation of the portable communication device 100 from the first communication mode to the second communication mode in response to a limit detected signal from the limit of signal coverage detector 140 indicating detection of an edge or limit of the wireless local area communication path signal coverage. Therefore, when a predetermined limit detected signal is received 514, the controller 112 activates the second transceiver circuitry 516, switching operation from the first communication mode to the second communication mode, by entering the system access state 206 and providing a registration message to the transceiver circuitry 116 for transmission therefrom.

While at least one exemplary embodiment has been presented in the foregoing detailed description of the invention, it should be appreciated that a vast number of variations exist. It should be noted that while the exemplary embodiment is described relative to CDMA, the invention applies to other wide area wireless networks such as HRPD and WCDMA. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for power conservation in a portable communication device capable of communication on either of a first communication path and a second communication path, the method comprising the steps of:
 detecting signals of a first communication path;
 operating in a first communication mode on the first communication path;

deregistering from the second communication path while operating in the first communication mode on the first communication path;
while deregistered from the second communication path, monitoring at least one housekeeping channel on the second communication path at times separated by a predetermined time interval; and
switching operation from the first communication mode to a second communication mode on the second communication path in response to a predetermined event.

2. The method for power conservation of claim 1 wherein the step of switching operation comprises the step of switching operation from the first communication mode to the second communication mode in response to a predetermined user input indicating an emergency call.

3. The method for power conservation of claim 1 wherein the step of switching operation comprises the step of switching operation from the first communication mode to the second communication mode in response to a predetermined user input indicating a request for a communication type not supported by the first communication mode.

4. The method for power conservation of claim 1 wherein the step of switching operation comprises the step of switching operation from the first communication mode to the second communication mode in response to detecting a limit of signal coverage of the first communication path.

5. The method for power conservation of claim 1 wherein the step of switching operation comprises the step of registering with the second communication path.

6. The method for power conservation of claim 1 wherein the first communication path is a wireless local area network communication path.

7. The method for power conservation of claim 1 wherein the second communication path is a wide area network communication path.

8. The method for power conservation of claim 7 wherein the wide area network communication path is a CDMA system comprising a paging channel, and wherein the at least one housekeeping channel comprises the paging channel.

9. The method for power conservation of claim 1 wherein the step of monitoring the at least one housekeeping channel comprises the steps of:
detecting configuration change indicators on the second communication path while deregistered therefrom; and
updating overhead information for controlling operation of the portable communication device in the second communication mode in response to detecting configuration change indicators.

10. A method for power conservation in a portable communication device capable of communication on either of a first communication path and a second communication path, the second communication path comprising a CDMA system including a paging channel, the method comprising the steps of:
monitoring paging indicator bits on the second communication path when registered to the second communication path;
detecting signals of a first communication path;
operating in a first communication mode on the first communication path;
monitoring the paging indicator bits on the paging channel on the second communication path at times separated by a predetermined time interval when deregistered from the second communication path; and
switching operation from the first communication mode to a second communication mode on the second communication path in response to a predetermined event.

11. A method for power conservation in a portable communication device capable of communication on either of a first communication path and a second communication path, wherein the second communication path is a communication system comprising predetermined operational parameters, the predetermined operational parameters including a plurality of slot cycle indices, the method comprising the steps of:
detecting signals of a first communication path;
operating in a first communication mode on the first communication path;
monitoring at least one housekeeping channel on the second communication path at times separated by a predetermined time interval, wherein the predetermined time interval is defined by one of the plurality of slot cycle indices; and
switching operation from the first communication mode to a second communication mode on the second communication path in response to a predetermined event.

12. The method for power conservation of claim 11 wherein the predetermined time interval is defined by a slot cycle index larger than the slot cycle index used by the portable communication device on the second communication path.

13. A portable communication device for operating in a first communication mode on a wireless local area network communication path and for operating in a second communication mode on a CDMA communication path wherein the CDMA communication path includes a quick paging channel and a pilot channel, the portable communication device comprising:
first transceiver circuitry for sending and receiving signals on the wireless local area network communication path;
second transceiver circuitry for sending and receiving signals on the CDMA communication path;
a user interface for receiving a user input indicating placing an emergency call and generating an emergency call signal in response thereto;
means for detecting if the device is at the limit of the signal coverage area of the wireless local area network communication path and generating a limit detected signal to the controller; and
a controller coupled to the first transceiver circuitry, the second transceiver circuitry, the user interface and the limit of signal coverage detector for (a) determining that the portable communication device is within signal coverage of the wireless local area network communication path in response to the limit detected signal, (b) activating the first transceiver circuitry to send and receive signals on the wireless local area network communication path, (c) providing a deregistration message to the second transceiver circuitry for transmission therefrom in response to determining that the portable communication device is within signal coverage of the wireless local area network communication path, (d) deactivating the second transceiver circuitry, (e) activating the second transceiver circuitry at times separated by a predetermined time interval to monitor at least one of the quick paging channel or the pilot channel of the CDMA communication path, the predetermined time interval corresponding to slot cycle indexes of the CDMA communication path that are equal to or greater than the slot cycle index used by the device when registered in CDMA, and (I) activating the second transceiver circuitry to operate in the second mode in response to one of the limit detected signal or the emergency call signal.

* * * * *